US012791302B2

(12) United States Patent
Lee et al.

(10) Patent No.: US 12,791,302 B2
(45) Date of Patent: Nov. 10, 2026

(54) JIG FOR REFLECTION DEVICE AND ASSEMBLY INCLUDING THE SAME

(71) Applicants: HYUNDAI MOTOR COMPANY, Seoul (KR); KIA CORPORATION, Seoul (KR); HYUNDAI WIA CORPORATION, Changwon-si (KR)

(72) Inventors: Dong Ho Lee, Suwon-si (KR); Tae Hwan Kwak, Yongin-si (KR); Sang Bin Han, Hwaseong-si (KR); Myung Kyun Jeong, Hwaseong-si (KR); Chang Hoon Lee, Jeju-si (KR); Dae Hong Kim, Changwon-si (KR); Jeong Rak Kim, Daegu (KR); Suk Hyun Yoon, Changwon-si (KR); Tae Jin Song, Uiwang-si (KR); Cheol Bae Park, Changwon-si (KR); Jun Young Choi, Gimhae-si (KR)

(73) Assignees: Hyundai Motor Company, Seoul (KR); Kia Corporation, Seoul (KR); Hyundai WIA Corporation, Changwon-si (KR)

( * ) Notice: Subject to any disclaimer, the term of this patent is extended or adjusted under 35 U.S.C. 154(b) by 0 days.

(21) Appl. No.: 18/960,409

(22) Filed: Nov. 26, 2024

(65) Prior Publication Data

US 2025/0205790 A1 Jun. 26, 2025

(30) Foreign Application Priority Data

Dec. 21, 2023 (KR) ........................ 10-2023-0188629
Dec. 26, 2023 (KR) ........................ 10-2023-0191513

(51) Int. Cl.
*G01B 5/00* (2006.01)
*G01B 11/00* (2006.01)

(52) U.S. Cl.
CPC .......... *G01B 11/002* (2013.01); *G01B 5/0004* (2013.01); *Y10T 279/1008* (2015.01); *Y10T 279/23* (2015.01)

(58) Field of Classification Search
CPC .. Y10T 279/1008; Y10T 279/10–1095; G01B 5/0002; G01B 5/0004; B23B 31/4006; B23B 31/4013; B23B 31/40–42
(Continued)

(56) References Cited

U.S. PATENT DOCUMENTS 3,311,383 A * 3/1967 Cox .................... B23B 31/4033 279/2.03
4,943,071 A * 7/1990 Srebot ................. B23B 31/4013 301/124.1

(Continued)

FOREIGN PATENT DOCUMENTS

JP 2023-102418 A 7/2023
KR 10-2011-0062712 A 6/2011

(Continued)

*Primary Examiner* — Erica E Cadugan
(74) *Attorney, Agent, or Firm* — Fish & Richardson P.C.

(57) ABSTRACT

A jig for a reflection device includes a collet having a skirt portion with an expandable outer diameter and a locking head on one end of the skirt portion, a sleeve into which the collet is inserted and one side of which is supported by being caught by the locking head, and an expansion pin inserted into the collet and expanding the outer diameter of the skirt portion.

11 Claims, 9 Drawing Sheets

(58) Field of Classification Search
USPC ................................................ 279/2.01–2.24
See application file for complete search history.

(56) References Cited

U.S. PATENT DOCUMENTS

| | | | | |
|---|---|---|---|---|
| 8,806,764 | B1 * | 8/2014 | Tanay | G01B 5/004 33/645 |
| 2006/0097463 | A1 * | 5/2006 | Laube | B23B 31/2073 279/43.2 |

FOREIGN PATENT DOCUMENTS

| | | | |
|---|---|---|---|
| KR | 10-2023-0040211 | A | 3/2023 |
| KR | 10-2548905 | B1 | 6/2023 |

* cited by examiner

JIG FOR REFLECTION DEVICE AND ASSEMBLY INCLUDING THE SAME

CROSS-REFERENCE TO RELATED APPLICATION(S)

This application claims benefit of priority to Korean Patent Application No. 10-2023-0191513, filed on Dec. 26, 2023 and Korean Patent Application No. 10-2023-0188629, filed on Dec. 21, 2023 in the Korean Intellectual Property Office, the disclosures of which are incorporated herein by reference in their entirety.

TECHNICAL FIELD

The present disclosure relates to a jig for a reflection device and an assembly including the same.

BACKGROUND

Laser trackers may be used to accurately measure position during the assembly of large devices such as aircraft or ships. Additionally, a reflection device is used to reflect the laser emitted from the laser tracker.

The reflector jig of the related art may have a pin (shank) attached to the reflector attachment portion, and the size of the outer diameter of the pin cannot be adjusted after production.

In order to apply a jig, it is typically necessary to precisely manufacture the cylindrical inner diameter of the measuring portion in consideration of the pin diameter, and if necessary, the outer diameter of the pin should be manufactured to the required dimensional tolerance and attached. A cylindrical magnet may be installed in the attachment part of the reflector, and the reflector (formed of magnetic stainless steel) may adhere to the attachment surface by magnetic force. Additionally, the angle of the reflector may be adjusted while in close contact in the laser tracker direction.

In some cases, when measuring products with a relatively large inner diameter tolerance range, there may be a difference in dimensions of an actual shaft and a hole, which may cause inaccurate centering measurement errors. In addition, when the reflector should be installed in the direction of gravity, related art jigs on the market do not have a self-fixing function, and thus, it may be necessary to prepare measures to prevent deviation in the direction of gravity.

In some cases, the reflector for a laser tracker may be attached to the reflector jig and installed in the measurement position. Generally, when attaching a reflector to a cylindrical hole, since the diameter of the pin part of the reflector jig inserted into the cylindrical hole is fixed, an error may occur between the center of the cylindrical hole and the center of the reflector due to clearance if the diameter of the cylindrical hole varies within the tolerance.

In some cases, if the required precision of the coordinates to be measured is high, there may be difficulties in measuring the required coordinates due to these errors. Accordingly, there is a need for a reflector attachment jig that allows for a flexible response to prevent clearance within tolerances and that is easy to disassemble and assemble.

SUMMARY

An aspect of the present disclosure is to provide a jig for fixing a laser tracker reflector, which has a simple structure and may be flexibly installed on a fixed body.

In addition, an aspect of the present disclosure is to provide a structure for a jig for fixing a laser tracker reflector that is easy to install and remove even if the size of a fixing hole of a fixed body is changed.

According to an aspect of the present disclosure, a jig for a reflection device includes a collet having a skirt portion with an expandable outer diameter and a locking head on one end of the skirt portion; a sleeve into which the collet is inserted and one side of which is supported by being caught by the locking head; and an expansion pin inserted into the collet and expanding the outer diameter of the skirt portion.

The jig for a reflection device may include a core fixed to an inside of the collet and screw-coupled with an adjustment screw pulling the expansion pin to be inserted into the inside of the collet.

The adjustment screw may penetrate through the sleeve and may be screwed to the core.

The adjustment screw may include a head portion caught by the expansion pin; a body portion extending from the head portion; and a threaded portion provided on an end of the body portion, having a diameter larger than a diameter of the body portion, and screwed to the core.

The expansion pin may have a through-hole through which the adjustment screw penetrates and is inserted, and the through-hole may be provided in a shape of a snowman.

The through-hole may have a shape in which a first hole having a diameter larger than the diameter of the threaded portion and a second hole having a diameter larger than the diameter of the body portion and smaller than the diameter of the threaded portion are interconnected.

The head portion may have a diameter larger than the diameter of the first hole.

The core and the locking head of the collet may be provided with a magnetic portion therebetween.

The core may be bolted to the collet along with the sleeve.

The core, the sleeve, and the collet may be provided as a single body.

The skirt portion may have a first tapered portion on an inner surface thereof and having an inner diameter becoming smaller in a direction toward the locking head.

The expansion pin may have a second tapered portion on an outer surface thereof and having an outer diameter becoming smaller in a direction of insertion into the collet.

The sleeve and the collet may be provided as a single body.

According to an aspect of the present disclosure, a jig for a reflection device includes a collet having a skirt portion with an expandable outer diameter and a locking head having an outer diameter larger than the outer diameter of the skirt portion; an expansion pin inserted into the collet and expanding the outer diameter of the skirt portion; and a core fixed to an inside of the collet and screw-coupled with an adjustment screw pulling the expansion pin to be inserted into the inside of the collet.

An inner surface of the skirt portion or an outer surface of the expansion pin may be provided with a tapered portion having an inner diameter becoming smaller in a direction toward the locking head.

According to an aspect of the present disclosure, a jig assembly for a reflection device includes a fixed body having a fixing hole; a collet inserted into one side of the fixing hole and having a skirt portion with an expandable outer diameter; an expansion pin inserted into the other side of the fixing hole, inserted into an inside of the collet, and expanding the outer diameter of the skirt portion so that the skirt portion comes into close contact with an inside of the fixing hole; and a core fixed to the inside of the collet and screw-coupled with an adjustment screw pulling the expansion pin to be inserted into the inside of the collet.

An inner surface of the fixing hole and an outer surface of the collet may be provided with a support member therebetween.

The jig assembly for a reflection device may further include a sleeve into which the collet is inserted and one side of which is caught and supported by the locking head, and the sleeve may be provided between the fixed body and the collet, and has one side supported by the fixed body and the other side supported by the collet.

The collet may have a magnetic portion, and a reflection unit having a magnet may be fixed to the collet by attraction with the magnetic portion of the collet.

The reflection unit may have a rounded shape in a portion coupled to the collet.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
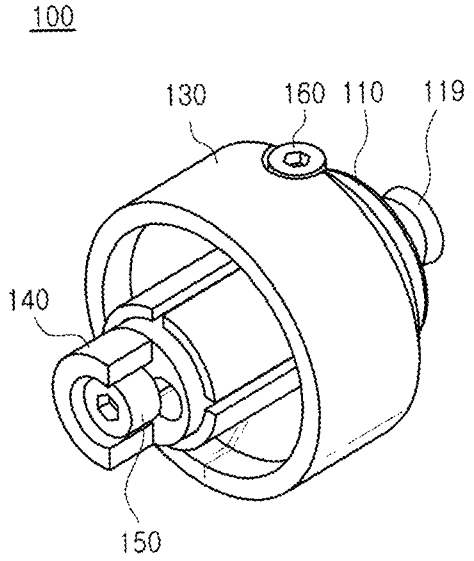
FIG. 1 is a combined perspective view showing an example of a jig for a reflection device.

The present disclosure may describe one or more implementations, and specific implementations will be illustrated in the drawings and described in detail. However, this is not intended to limit the present disclosure to specific implementations, and should be understood to include all changes, equivalents, and substitutes included in the spirit and technical scope of the present disclosure.

In the description below, the terms "anterior," "posterior," "lateral," "front," "back," "up/down," "above," "upper," "top," "below," "lower," "bottom," "left/right," and the like, used in relation to direction, are defined based on the vehicle or body of the car. In addition, terms such as first, second and the like may be used to describe various components, but these components are not limited in order, size, location, or importance by terms such as first, second and the like, and are named only for the purpose of distinguishing one component from other components.

Hereinafter, example implementations will be described in more detail with reference to the attached drawings.

Figure 2:
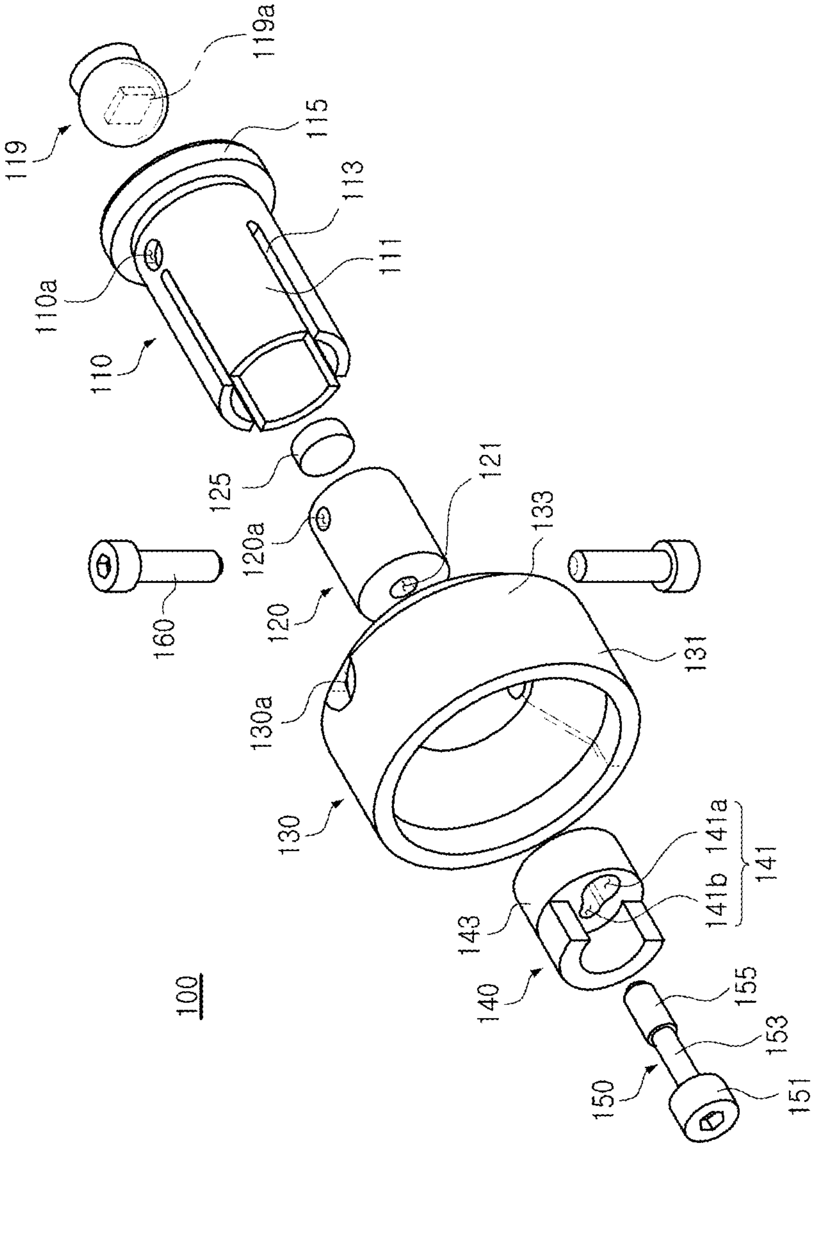
FIG. 2 is an exploded perspective view showing an example of a jig for a reflection device.
Figure 3:
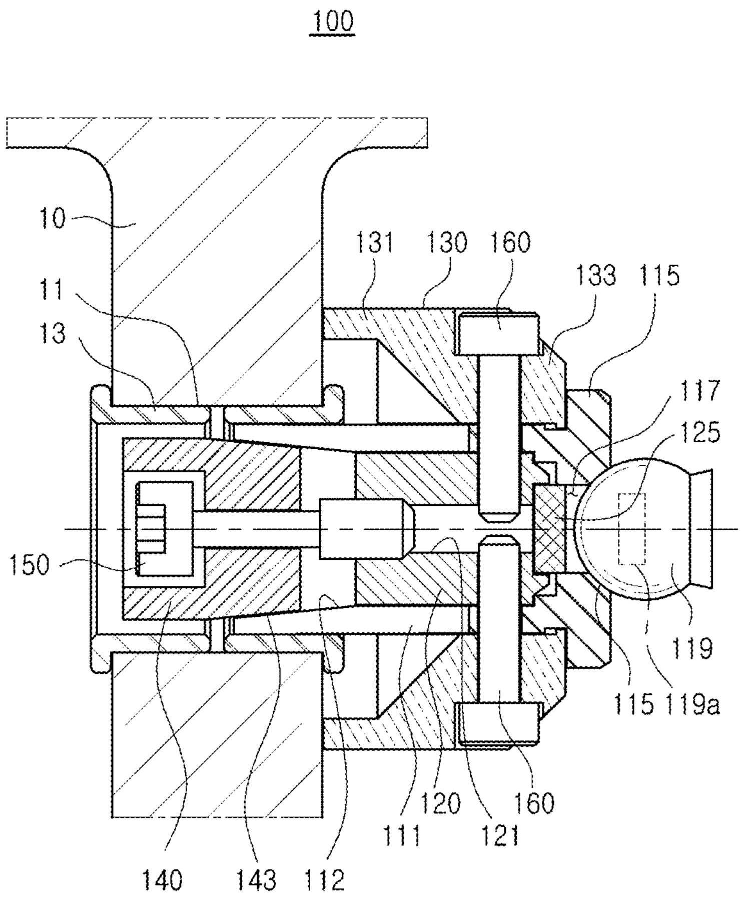
FIG. 3 is a cross-sectional view showing an example of installation of a jig for a reflection device.

Referring to FIGS. 1 to 3, a jig 100 for a reflection device may include a collet 110, a sleeve 130, and an expansion pin 140. A reflection unit may be fixed to the collet 110.

The collet 110 may be fixed to a fixing hole 11 of a fixed body 10 through the sleeve 130 and the expansion pin 140. A magnetic portion 125 (for example, magnet or the like) may be provided inside the collet 110, a magnet 119*a* may also be provided inside the reflection unit, the reflection unit 119 may be fixed to the collet 110 by the attraction (magnetic force) of the magnet 119*a* and the magnetic portion 125.

In some implementations, the jig 100 for a reflection device may be provided with a core 120 and an adjustment screw 150 that may be fixed to the core 120, so that the expansion pin 140 may be easily fixed to the inside of the collet 110.

The collet 110 may be provided with a skirt portion 111 whose outer diameter is expandable and a locking head 115 at one end of the skirt portion 111. In addition, the skirt portion 111 may be provided with a slit 113 having a length in the longitudinal direction to facilitate expansion of the outer diameter, and a first tapered portion 112 on the inner surface, of which an inner diameter becomes smaller in the direction of the locking head 115.

The locking head 115 may be provided with a diameter larger than that of the skirt portion 111, and may be supported in a state in which the skirt portion 111 is inserted into the sleeve 130 and the locking head 115 is caught on the sleeve 130. The collet 110 may be provided with a first fixing hole 110*a* for firm coupling between the sleeve 130 and the core 120 in the future, and a fixing screw 160 is inserted into a first fixing hole 110*a*, to be firmly coupled to the sleeve 130 and the core 120.

The sleeve 130 may be supported by having the collet 110 inserted therein and one side of the sleeve 130 being caught by the locking head 115 of the collet 110. For example, one side of the sleeve 130 may be supported by the fixed body 10, and the locking head 115 may be supported on the other side of the sleeve 130 in a state in which the collet 110 is inserted into the sleeve 130. Accordingly, the height of the collet 110 may be accurately set, and the installation height (axial position) of the reflection unit installed on the collet 110 may also be accurately set.

The sleeve 130 may include a support portion 131 supported by the fixed body 10 and a fixing portion 133 on which the collet 110 is firmly fixed and supported. The sleeve 130 may be provided in an overall cylindrical shape for convenience of support, and the fixing portion 133 may be provided with a third fixing hole 130*a* into which the aforementioned fixing screw 160 is inserted and fixed. The fixing screw 160 may be fixed by being inserted into the first fixing hole 110*a*, the second fixing hole 120*a*, and the third fixing hole 130*a* with the collet 110 and the core 120 inserted into the sleeve 130. Accordingly, the positions of the sleeve 130, collet 110, and core 120 may be accurately set.

A core 120 may be fixedly provided inside the collet 110. The collet 110 has a structure that allows the skirt portion 111 to be expanded (for example, elastically deformed) by insertion of the expansion pin 140, and to implement this structure, a core 120 to which an adjustment screw 150 applying insertion force to the inserted expansion pin 140 is fixed may be fixed to the collet 110.

The core 120 may be provided in a cylindrical shape, and the body may be provided with a screw coupling portion 121 so that the adjustment screw 150 may be inserted and screwed together. The screw coupling portion 121 may be a hole with a female thread provided to have a long length in the direction in which the expansion pin 140 is inserted.

The threaded portion 155 of the adjustment screw 150 may be coupled to the screw coupling portion 121, and the threaded portion 155 may have male threads that may be screwed to the screw coupling portion 121 on the outer surface thereof. For example, as the expansion pin 140 is gradually inserted into the skirt portion 111 by screw coupling of the threaded portion 155, the outer diameter of the skirt portion 111 may be expanded. The outer diameter of the expanded skirt portion 111 is tightly adhered to the inside of the fixing hole 11 of the fixed body 10, so that the collet 110 may be fixed.

The body may be provided with a second fixing hole 120*a* into which the aforementioned fixing screw 160 is inserted and fixed. Of course, it is not limited to the screw connection method, and the collet 110 and the core 120 may be joined by welding, press fitting, bonding using a bond, or shrink fit in addition to the screw (bolt) method. Initially, the collet 110 and the core 120 may be provided as a single body.

The fixing screw 160 may be fixed by being inserted into the first fixing hole 110*a*, the second fixing hole 120*a*, and the third fixing hole 130*a* with the collet 110 and the core 120 inserted into the sleeve 130. Accordingly, the positions of the sleeve 130, collet 110, and core 120 may be accurately set.

In some implementations, the collet 110, core 120, and sleeve 130 may be provided selectively or entirely as one piece. As described above, these three members may ultimately be firmly fixed to each other using the fixing screws 160. However, the present disclosure is not limited thereto, and these members may be joined by welding, press-fitting, bonding using a bond, shrink fit, or the like, in addition to the screw coupling method, and may be provided as one piece from the beginning.

For example, the collet 110 and the core 120 (two-member integral type), or the collet 110 and the sleeve 130 (two-member integral type), or the collet 110, the core 120 and the sleeve 130 (three-member integrated type) may be an integrated structure from the beginning.

In some implementations, a magnetic portion 125 may be provided inside the collet 110. In some examples, when the jig 100 for a reflection device is fixed to the fixed body 10, the reflection unit may be coupled to the collet 110. A magnetic portion 125 (for example, magnet) may be provided inside the collet 110, a magnet 119*a* may also be provided inside the reflection unit, and the reflection unit 119 may be fixed to the collet 110 by the attraction (magnetic force) of the magnetic portion 125 and the magnet 119*a*. Of course, it is not limited to this magnetic coupling structure and may be fixed in various manners.

An opening 117 may be provided in the upper end of the collet 110 to expose the magnetic portion 125 to the outside. The reflection unit 119 may be fitted into and coupled to the opening 117. The reflection unit 119 may be provided in a rounded shape (for example, spherical shape or the like) in a portion coupled to the collet 110 (reflection device), the attractive action of the magnet 119*a* and the magnetic portion 125 provided therein may be facilitated, and the reflection unit may have an opening 117 to guide the position in which the reflection unit is fixed. The opening 117 may have a rounded shape and may be provided with a cutting portion 117*a* on the edge that forms a tapered surface to facilitate seating of the reflection unit 119.

The expansion pin 140 may be inserted into the collet 110 to expand the outer diameter of the skirt portion 111. The expansion pin 140 may have a through-hole 141 through which the adjustment screw 150 is inserted. When the threaded portion 155 of the adjustment screw 150 inserted into the through-hole 141 is screwed to the screw coupling portion 121 of the core 120 and pulled, the expansion pin 140 caught on the head portion 151 of the adjustment screw 150 is pulled together and inserted into the collet 110 to expand the outer diameter of the skirt portion 111.

The expansion pin 140 may be provided, on the outer surface thereof, with a second tapered portion 143 of which the outer diameter becomes smaller in the direction in which it is inserted into the collet 110, and the second tapered portion 143 is inserted into the skirt portion 111, while being in close contact with the first tapered portion 112 of the collet 110, and thus, expansion of the outer diameter of the skirt portion 111 may be facilitated.

The adjustment screw 150 may be inserted through the expansion pin 140 and screw-coupled to the core 120.

The adjustment screw 150 may include a head portion 151 caught on the expansion pin 140, a body portion 153 extending from the head portion 151, and a threaded portion 155 provided at the end of the body portion 153, having a larger diameter than the body portion 153 and screw-coupled to the core 120. In this case, the diameter sizes of respective portions of the adjustment screw 150 may be provided in the order of head portion 151>threaded portion 155>body portion 153.

The expansion pin 140 has the through-hole 141 through which the adjustment screw 150 is inserted, and the through-hole 141 may be provided in the shape of a snowman (e.g., a closed curve shape in which two circular/elliptical shapes are connected). For example, the through-hole 141 may have a shape in which the first hole portion 141*a*, which has a larger diameter than the threaded portion 155, and the second hole portion 141*b*, which has a larger diameter than the body portion 153 and a smaller diameter than the threaded portion 155, are interconnected. Additionally, the head portion 151 may have a larger diameter than the first hole portion 141*a*. Ultimately, the size of the diameter may be provided in the following order: head portion 151>first hole portion 141*a*>threaded portion 155>second hole portion 141*b*>body portion 153.

Figure 4A:
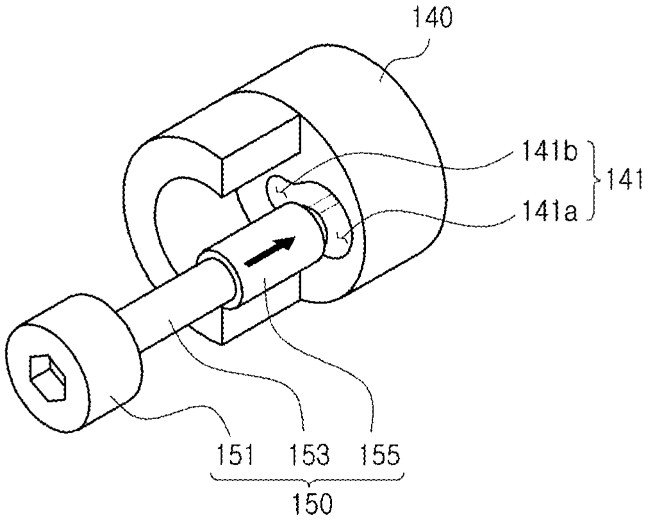
FIGS. 4A-4B are reference diagrams illustrating an example of a process of inserting an adjustment screw into an expansion pin of a jig for a reflection device.
Figure 4B:
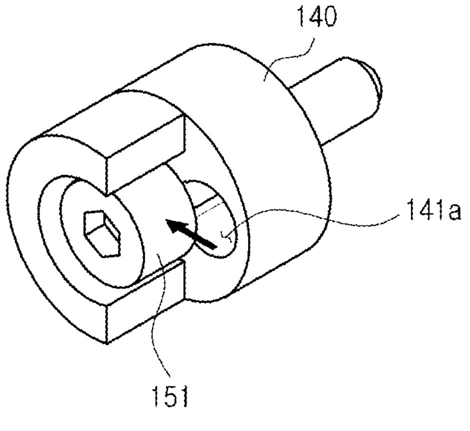

Accordingly, as illustrated in FIGS. 4A-4B, the adjustment screw 150 may be inserted into the expansion pin 140 through the first hole portion 141*a* (refer to FIG. 4A), and may be coupled to be shifted in the direction of the second hole portion 141*b* (please refer to FIG. 4B). Accordingly, the threaded portion 155 of the adjustment screw 150 may be caught in the second hole portion 141*b* and may not be separated. In addition, when the threaded portion 155 is caught in the second hole portion 141*b*, in the case in which the expansion pin 140 is removed from the skirt portion 111 later, since the expansion pin 140 is screwed off while the threaded portion 155 of the adjustment screw 150 is caught in the second hole portion 141*b* of the expansion pin 140, the expansion pin 140 may be easily separated from the collet 110 by being pushed together with the adjustment screw 150.

Figure 5:
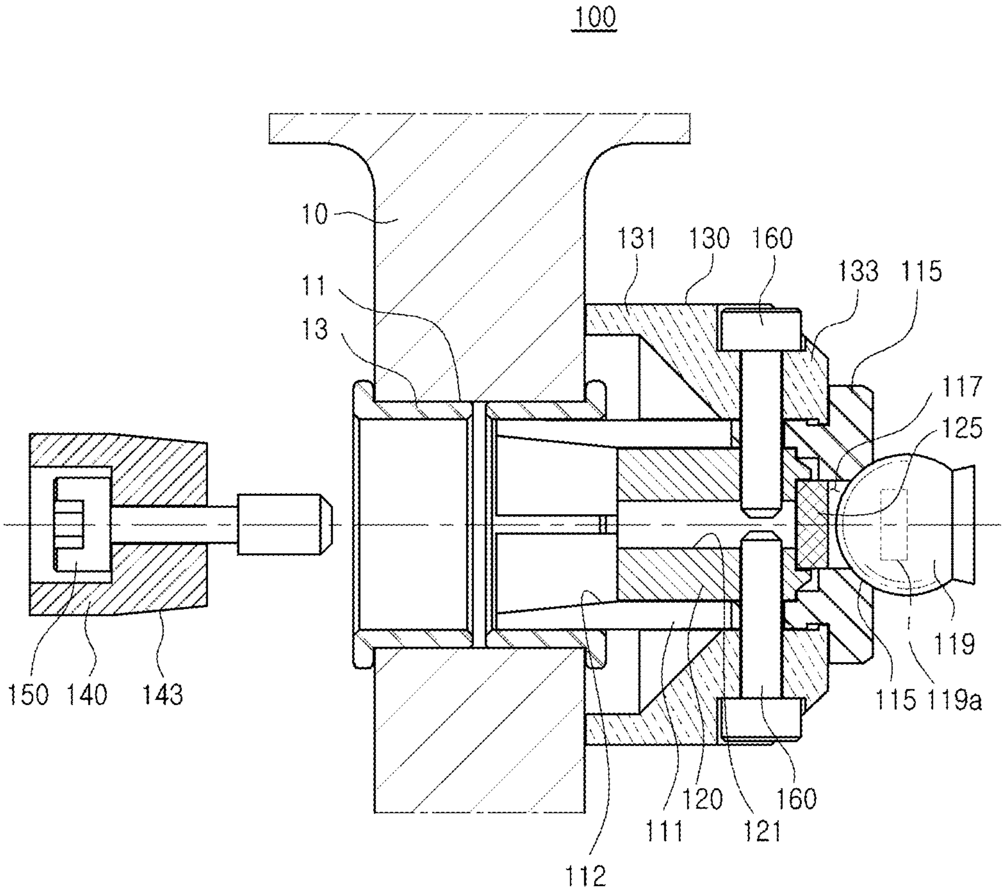
FIGS. 5 and 6 are reference diagrams illustrating an example of a process of installing a jig for a reflection device to a fixed body.
Figure 6:
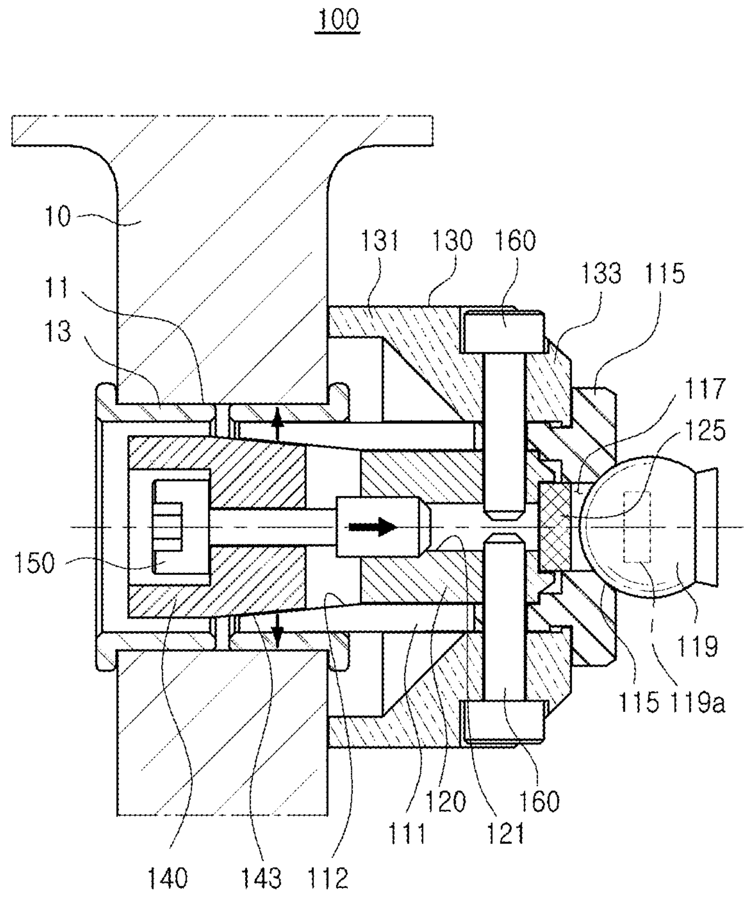

Referring to FIGS. 5 and 6, the process of fixing the jig 100 for a reflection device to the fixed body 10 is provided, and accordingly, when the jig 100 for a reflection device is fixed to the fixed body 10, a jig assembly for a reflection device may be provided.

Referring to FIG. 5, first, with the collet 110 and the core 120 inserted into the sleeve 130, the sleeve 130 is supported on the fixed body 10, and the skirt portion 111 of the collet 110 is inserted into the fixing hole 11 of the fixed body 10 from one direction. Of course, in this case, a support member 13 may be provided between the fixing hole 11 and the skirt portion 111. The support member 13 may be formed of an elastic material such as rubber, silicone, plastic, or the like.

Then, the expansion pin 140 in which the adjustment screw 150 is inserted into the second hole portion 141*b* in the manner illustrated in FIG. 4B may be through the other direction of the fixing hole 11.

Next, referring to FIG. 6, when the threaded portion 155 of the adjustment screw 150 is coupled to the screw coupling portion 121 of the core 120 and turned (screw coupling), the expansion pin 140 caught on the head portion 151 of the adjustment screw 150 is pushed into the interior of the collet 110, so that the skirt portion 111 expands outwardly, and thus, the expansion pin 140 may be firmly coupled to the fixing hole 11 of the fixed body 10.

Figure 7:
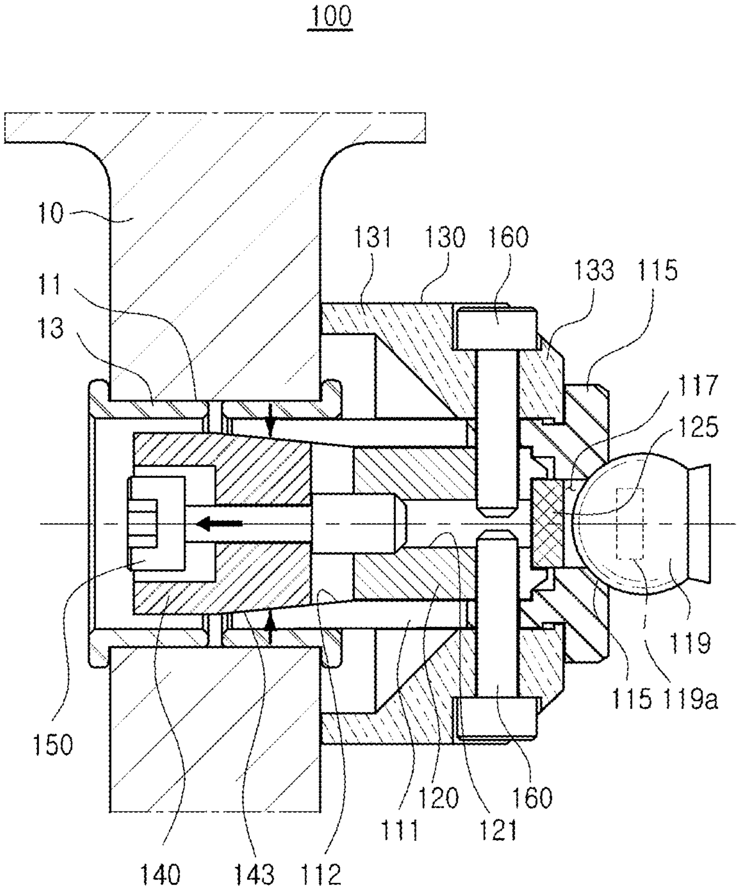
FIG. 7 is a cross-sectional view illustrating an example of a process of removing a jig for a reflection device from a fixed body.

Next, referring to FIG. 7, the process of removing the jig 100 for a reflection device from the fixed body is illustrated.

The jig 100 for a reflection device, which is firmly coupled to the fixing hole 11 of the fixed body 10, rotates the threaded portion 155 of the adjustment screw 150 to be separated from the screw coupling portion 121 of the core 120.

In some examples, during this process, it may not be easy to remove the expansion pin 140 that is firmly embedded inside the skirt portion 111. Therefore, in some implementations, by the structure of the through-hole 141 having a first hole portion 141*a* and a second hole portion 141*b*, and the structure of the adjustment screw 150 having different diameters of the body portion 153 and the threaded portion 155, removal of the expansion pin 140 from the skirt portion 111 may be easily implemented.

For example, as illustrated in FIG. 7, when the adjustment screw 150 is rotated in the process of loosening the screw to separate the adjustment screw 150 from the core 120, the threaded portion 155 of the adjustment screw 150 is pushed in the direction in which the expansion pin 140 is separated, and in this process, the threaded portion 155 of the adjustment screw 150 is caught in the second hole portion 141*b*, which is a hole with a smaller diameter than the threaded portion 155. Accordingly, as the adjustment screw 150 is pushed in the direction of separation, the expansion pin 140 caught on the threaded portion 155 is also naturally pushed in the direction of separation, and ultimately, the expansion pin 140 may be pushed out of the skirt portion 111.

Figure 8:
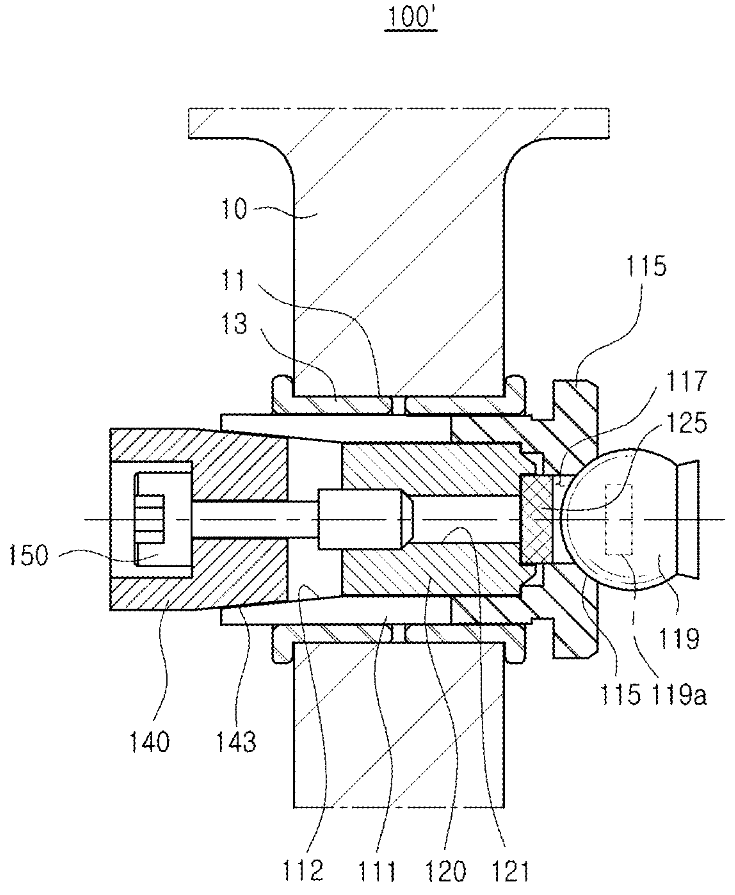
FIG. 8 is a cross-sectional view showing an example of installation of a jig for a reflection device.

Referring to FIG. 8, a jig 100' for a reflection device is illustrated. When compared to the jig 100 for a reflection device described with reference to FIGS. 1 to 7, the jig 100' for a reflection device has a structure that does not include only the sleeve 130, and all other structures may be the same. Accordingly, the same reference numerals are used for all implementations, and a description of the detailed configuration is omitted.

The jig 100' for a reflection device may not be provided with a sleeve 130.

In some implementations, the jig 100' for a reflection device may include a collet 110 having a skirt portion 111 whose outer diameter is expandable and a locking head whose outer diameter is larger than the skirt portion 111, an expansion pin 140 that may be inserted into the collet 110 to expand the outer diameter of the skirt portion 111, and an adjustment screw 150 is fixed inside the collet 110 and pulls the expansion pin 140 to be inserted into the collet 110.

Accordingly, the collet 110 may have a structure in which the collet 110 is interconnected or integrated only with the core 120 in various manners. In addition, the structure in which the expansion pin 140 is coupled to the collet 110 through the adjustment screw 150 is the same as the structure described above with reference to FIGS. 1 to 7.

In some implementations, the jig 100' for a reflection device may not include the sleeve 130, and thus, may not have a structure in which the entire structure is supported by the sleeve 130 when fixed to the fixed body 10. Accordingly, the jig 100' for a reflection device may be installed by variously adjusting the height of the collet 110, and accordingly, the height of the reflection unit fixed to the collet 110 may be adjusted and installed in various manners.

For example, the reflection unit installed on the jig 100' for a reflection device may be mainly used for measurements that do not require an accurate height (axial position of the reflector).

As illustrated in FIG. 8, the locking head 115 of the collet 110 may be provided so that it is not caught or supported by the fixed body 10 or the support member 13 inserted into the fixing hole 11 of the fixed body 10. Of course, when considering a certain height of the reflection unit (axial position of the reflector), the locking head 115 may be provided to be caught or supported by the fixed body 10 or a support member 13 inserted into the fixing hole 11 of the fixed body 10.

Accordingly, the jig 100' for a reflection device may provide a jig assembly structure for fixing a reflection device that is slightly different from the structure in which the jig 100 for a reflection device is fixed to the fixed body 10.

Figure 9:
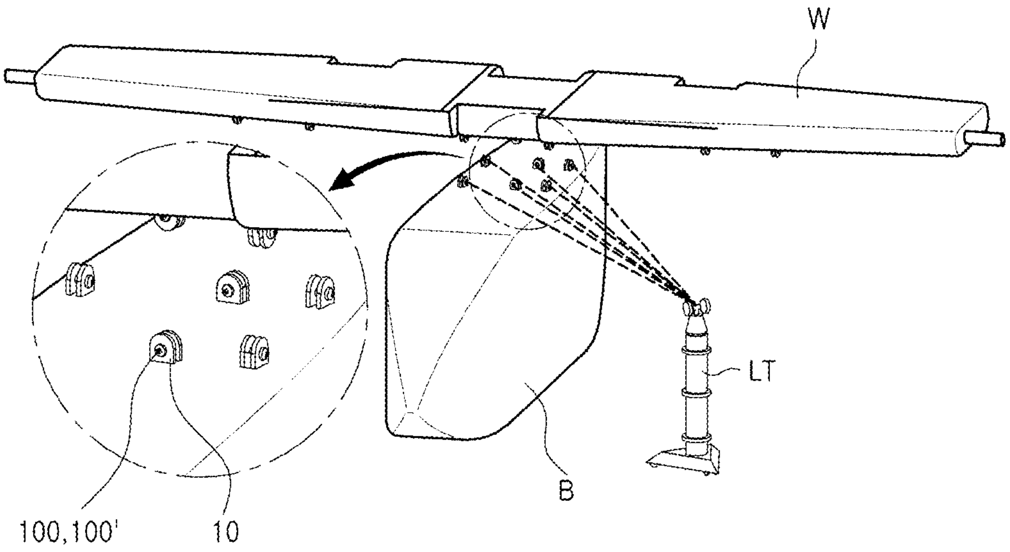
FIG. 9 is a reference diagram illustrating an example of use of a jig for a reflection device.

Referring to FIG. 9, an example of utilizing a jig for a reflection device is illustrated.

In some implementations, the jig (100, 100') for a reflection device may be used to accurately measure the relative positions between members joined in the process of assembling large devices such as aircraft or ships. For example, by utilizing the fact that the laser emitted from the laser tracker provided in a predetermined position is reflected by the reflector (119, reflector) provided in the jig (100, 100') for a reflection device, the exact location may be determined and assembly between members may be facilitated.

As illustrated in FIG. 9, a plurality of jigs 100 and 100' for fixing reflectors may be installed on the fuselage B and wings W, which may be provided with reflection units 119 (reflectors).

In addition, the relative positions of the fuselage (B) and the wing (W) may be determined by utilizing the fact that the laser fired from the laser tracker (LT) provided on the ground or at a predetermined location is reflected by the reflection unit 119 (reflector), and these may be assembled accurately and simply by considering the relative positions identified during the assembly process.

As set forth above, a jig for fixing a laser tracker reflector may have a simple structure and may be flexibly installed on a fixed body, and thus, it may be significantly easy to utilize and apply.

In addition, a structure for a jig for fixing a laser tracker reflector, which is easy to install and remove even if the size of a fixing hole of a fixed body is changed, may be provided.

While example implementations have been illustrated and described above, it will be apparent to those skilled in the art that modifications and variations could be made without departing from the scope of the present disclosure as defined by the appended claims.

What is claimed is:

1. A jig for a reflection device, comprising:

a collet comprising (i) a skirt portion having an outer diameter that is expandable and (ii) a locking head disposed at an end of the skirt portion;

a sleeve that receives the collet, wherein one side of the sleeve is supported and caught by the locking head;

an expansion pin configured to be inserted into the collet and to expand the outer diameter of the skirt portion;

an adjustment screw configured to press the expansion pin to thereby insert the expansion pin into an inside of the collet;

a core fixed to the inside of the collet and screw-coupled with the adjustment screw; and a magnetic portion disposed between the core and the locking head of the collet.

2. The jig of claim 1, wherein the adjustment screw is inserted into the sleeve and is screw-coupled to the core.

3. The jig of claim 2, wherein the adjustment screw comprises:

a head portion configured to be caught by the expansion pin;

a body portion that extends from the head portion; and a threaded portion disposed at an end of the body portion and screw-coupled to the core, and wherein a diameter of the threaded portion is larger than a diameter of the body portion.

4. The jig of claim 3, wherein the expansion pin defines a through-hole that receives the adjustment screw and has a snowman shape, the snowman shape having (i) a first hole having a diameter larger than the diameter of the threaded portion and (ii) a second hole having a diameter smaller than the diameter of the threaded portion, and wherein the adjustment screw passes through the through-hole.

5. The jig of claim 3, wherein the expansion pin defines a through-hole that comprises:

a first hole portion having a diameter larger than the diameter of the threaded portion; and a second hole portion that is connected to the first hole portion, the second hole portion having a diameter that is larger than the diameter of the body portion and smaller than the diameter of the threaded portion, and wherein the adjustment screw passes through the through-hole.

6. The jig of claim 5, wherein a diameter of the head portion is larger than the diameter of the first hole portion.

7. The jig of claim 1, wherein the core and the sleeve are bolted to the collet.

8. The jig of claim 1, wherein the core, the sleeve, and the collet define a single body.

9. The jig of claim 1, wherein the skirt portion comprises a first tapered portion disposed at an inner surface of the skirt portion.

10. The jig of claim 9, wherein the expansion pin comprises a second tapered portion disposed at an outer surface of the expansion pin.

11. The jig of claim 1, wherein the sleeve and the collet define a single body.

* * * * *